United States Patent
Schoener et al.

(10) Patent No.: US 12,114,622 B2
(45) Date of Patent: Oct. 15, 2024

(54) MODULAR WATER RETAINING TILES AND GREEN BLUE ROOF STRUCTURES CONTAINING AN ASSEMBLY OF SUCH TILES

(71) Applicant: Dow Global Technologies LLC, Midland, MI (US)

(72) Inventors: Cody Schoener, Lake Jackson, TX (US); Gregory S. Raymond, Chicago, IL (US)

(73) Assignee: Dow Global Technologies LLC, Midland, MI (US)

( * ) Notice: Subject to any disclaimer, the term of this patent is extended or adjusted under 35 U.S.C. 154(b) by 400 days.

(21) Appl. No.: 17/433,006

(22) PCT Filed: Feb. 24, 2020

(86) PCT No.: PCT/US2020/019427
§ 371 (c)(1),
(2) Date: Aug. 23, 2021

(87) PCT Pub. No.: WO2020/190452
PCT Pub. Date: Sep. 24, 2020

(65) Prior Publication Data
US 2022/0159916 A1    May 26, 2022

Related U.S. Application Data

(60) Provisional application No. 62/818,865, filed on Mar. 15, 2019.

(51) Int. Cl.
*A01G 9/033* (2018.01)
*B32B 3/26* (2006.01)
(Continued)

(52) U.S. Cl.
CPC .............. *A01G 9/033* (2018.02); *B32B 3/266* (2013.01); *B32B 5/18* (2013.01); *B32B 5/32* (2013.01);
(Continued)

(58) Field of Classification Search
CPC .............. A01G 9/033; B32B 2307/726; B32B 2419/06; B32B 27/20; B32B 27/40;
(Continued)

(56) References Cited

U.S. PATENT DOCUMENTS 5,250,340 A    10/1993 Bohnhoff
5,256,007 A    10/1993 Allen
(Continued)

FOREIGN PATENT DOCUMENTS

WO    2017/03373 A    1/2017

OTHER PUBLICATIONS

Rainsmart Solutions 300 Nero (R) Drainage Cell product literature, http://www.rainsmartsolutions.com/30mm_nero_drainage_cell.html#D, downloaded Feb. 11, 2019.
(Continued)

*Primary Examiner* — Hai Vo (57) ABSTRACT

Water containment modules for green and blue roof installations are disclosed. The modules include a water retaining module having a porous scaffold filled with a flexible hydrophilic foam, and a bottommost drainage layer having supports that define channels through which a fluid can flow away from the module. The module in some embodiment further includes an uppermost porous horticultural growth media layer that including a particulate filler embedded in a porous hydrophilic polymer foam.

14 Claims, 3 Drawing Sheets

(51) Int. Cl.
*B32B 5/18* (2006.01)
*B32B 5/32* (2006.01)
*B32B 27/20* (2006.01)
*B32B 27/40* (2006.01)
*E04D 11/00* (2006.01)

(52) U.S. Cl.
CPC .............. *B32B 27/20* (2013.01); *B32B 27/40* (2013.01); *E04D 11/002* (2013.01); *B32B 2266/0278* (2013.01); *B32B 2266/06* (2013.01); *B32B 2307/726* (2013.01); *B32B 2419/06* (2013.01)

(58) Field of Classification Search
CPC .. B32B 3/266; B32B 5/18; B32B 5/32; B32B 2266/0278; B32B 2266/06; E04D 11/002
See application file for complete search history.

(56) References Cited

U.S. PATENT DOCUMENTS

| | | |
|---|---|---|
| 6,428,870 B1 | 8/2002 | Bohnhoff |
| 6,736,569 B2 | 5/2004 | Lee |
| 8,555,586 B2 | 10/2013 | Lowe |
| 8,696,241 B2 | 4/2014 | Lee |
| 8,996,399 B1 | 4/2015 | Eiben |
| 9,814,187 B2* | 11/2017 | Macken ................. C08G 18/10 |
| 2003/0082359 A1 | 5/2003 | Scott |
| 2010/0126066 A1 | 5/2010 | Devos |
| 2011/0030291 A1 | 2/2011 | Whitfield |
| 2011/0097151 A1 | 4/2011 | Lee |
| 2013/0150477 A1* | 6/2013 | Celia ........................ C05G 5/40 521/170 |
| 2017/0314223 A1 | 11/2017 | Keshet |
| 2019/0352859 A1* | 11/2019 | Hartman ................. E01C 9/086 |

OTHER PUBLICATIONS

Rainsmart Solutions Ellipse (R) Tank Modules product literature, http://www.rainsmartsolutions.com/ellipse_tank_modules.html#D, downloaded Feb. 11, 2019.

BodPave 95 Porous Paving Grid product literature, http://terramgeosynthetics.com/products/porous-plastic-pavers, downloaded Feb. 11, 2019.

* cited by examiner

MODULAR WATER RETAINING TILES AND GREEN BLUE ROOF STRUCTURES CONTAINING AN ASSEMBLY OF SUCH TILES

This invention relates to water management and plant-growth systems for the roofs of buildings or other structures.

Precipitation that collects on the roofs of buildings or other structures, or on other large horizontal surfaces such as roadways and parking structures, is frequently discharged into local sewer systems. Many municipalities have combined sewer systems in which rainwater runoff is combined with domestic sewage and/or industrial wastewater, The runoff can put a strain on or even overwhelm the capacity of those systems, particularly when there is a heavy rainfall or rapid melting of snow or ice. This can result in flooding, discharge of untreated runoff and other problems.

In response to these problems, it has been proposed to detain and retain some or all of this water so the water is discharged into sewer systems more gradually, over a prolonged period of time.

Accordingly, so-called "blue" and "green" roofing structures are being developed. "Blue" roofing structures include ponding mechanisms that capture and hold the water, allowing it to be released at a controlled rate over time. "Green" roofing structures capture the water and provide at least some of it to a vegetation layer in which living plants are cultivated. The vegetation uses the water in metabolic processes and in addition dissipates water back to the atmosphere through evapotranspiration. Both blue and green roofing systems also usually include mechanisms for controlled discharge of water in excess of what the vegetation can use or in excess of the storage capacity of the system.

The captured water is often immobilized; having large quantities of standing water on the top of a building structure is normally not wanted. Furthermore, the upper surface of the roof structure should be weight-bearing, to tolerate foot traffic (for repairs and maintenance, for example), the weight of building mechanicals such as HVAC, power and other systems, recreational decks, structure and equipment and, in the case of green roofs, the weight of the soil and its containers and the vegetation.

Water-management systems such as these are multi-layered assemblies, the composition and organization of which often are controlled by municipal or other governmental regulations. For example, the City of Philadelphia, Pennsylvania, USA has promulgated a stormwater plan review plan that includes practice guidance for green roofs. That plan contemplates an assembly that includes, from bottom to top, a weight-bearing roof system, a moisture interception/root barrier layer, a drainage layer, a filter/separation fabric and a growing medium, the characteristics of each being as specified in the plan. Many other larger cities have promulgated similar review plans.

In addition to being highly complex structures, green/blue roofing systems such as these are time-consuming to assemble. They are typically assembled layer-by-layer in a labor-intensive process. Furthermore, these systems are expensive to repair. Localized damage cannot be repaired easily as it is necessary to remove and reinstall large sections of the structure.

A modular system offers the potential of simplifying the assembly of these water-management systems and thus reducing installation costs. Some attempts have been made to introduce modular components into drainage systems. US Published Patent Application No. 2017/0314223, for example, describes a modular drainage device that includes a water retention mat, a separate rigid frame and a perforated surface. U.S. Pat. No. 8,555,586 describes a modular drainage structure in which the individual modules have a load-bearing base that includes peripheral, top and bottom walls filled with a porous rigid polymer foam. Various types of modular drainage mats and/or soil support systems are commercially available or described in the patent literature. See, for example, U.S. Pat. Nos. 5,250,340, 5,256,007, 6,428,870, 6,736,569 and 8,696,241.

A modular soil layer product is the LiveRoof Green Roof System, in which an "engineered" soil is provided in a tray-like structure equipped with removable side barriers (called "Soil Elevators™"). By removing the "soil elevators", soil from adjacent modules can be spread to cover the seams between the modules, providing the appearance of a continuous soil layer.

This invention in one aspect is a water containment module, comprising:
  a) a water retaining layer comprising (a-1) a substantially planar scaffold, having a continuous or discontinuous top surface, a continuous or discontinuous bottom surface, spacing members extending from the bottom surface to the top surface, a height of 2.54 mm to 101.6 cm as measured from the top surface to the bottom surface, and a top surface area of 100 to 15,000 cm$^2$, the scaffold having top surface voids, bottom surface voids and internal voids that together define multiple fluid paths from and through the top surface to and through the bottom surface, a top surface void area of at least 25%, a bottom surface void area of at least 25%, an internal void volume of at least 50%, and a compressive strength of at least 50 kN/m$^2$ and (a-2) a hydrophilic flexible polymer foam having a dry foam density of 48 to 240 kg/m$^3$ filling the internal void area of the substantially planar scaffold and extending at least to external surfaces of the spacing members of the substantially planar scaffold;
  b) a drainage layer including weight-bearing members extending downwardly from the bottom surface of the water retaining layer, the drainage layer having a height of 0.508 to 10.16 cm and a void volume of at least 50%, the drainage layer being further characterized further characterized in that the weight-bearing members define multiple flow paths for the movement of a fluid flowing downward from the water-retaining layer to and out of side surfaces and/or the bottom surface of the drainage layer.

In some embodiments the water containment module of the invention further comprises c) a porous horticultural growth media layer bonded to the top surface of the water, the growth media layer having a thickness of 0.508 to 101.6 cm and comprising (c-1) at least one particulate filler embedded in (c-2) a porous hydrophilic polymer foam.

Figure 1:
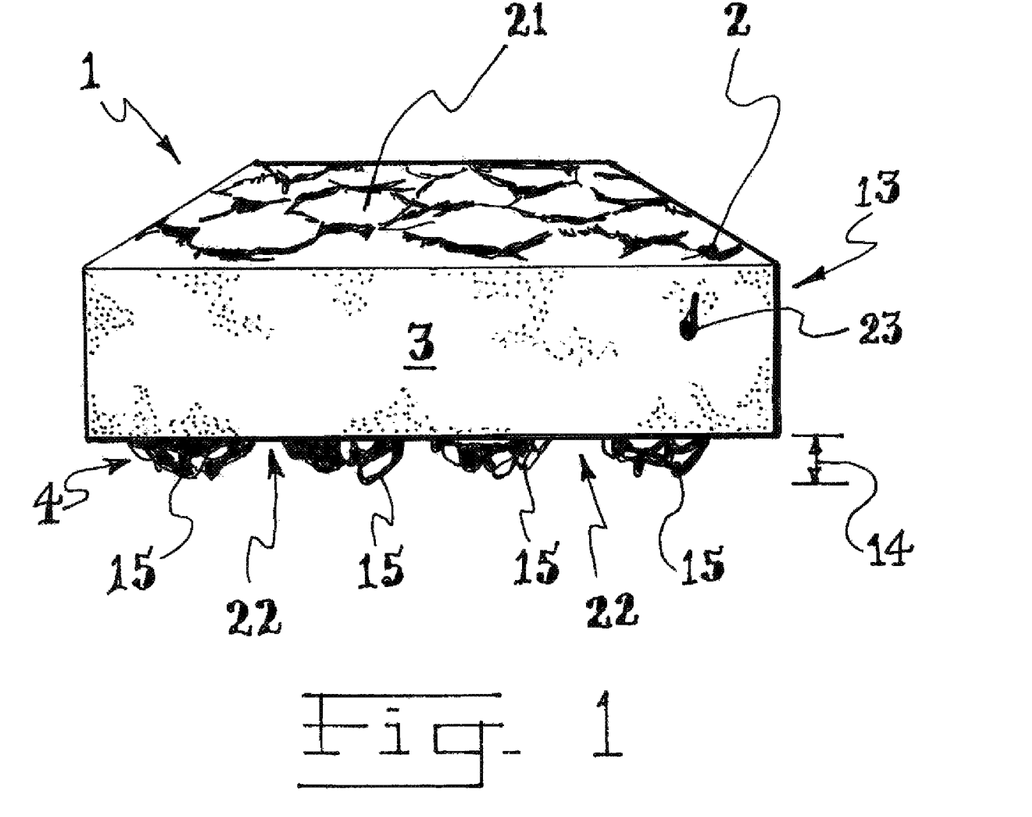
FIG. 1 is a front view of an embodiment of a water containment module of the invention.

Turning to FIG. 1, water containment module 1 includes water retaining layer 13 and drainage layer 4 which includes multiple weight-bearing members 15. Water retaining layer 13 includes scaffold 2 which is impregnated with hydrophilic flexible foam 3.

Figure 2:
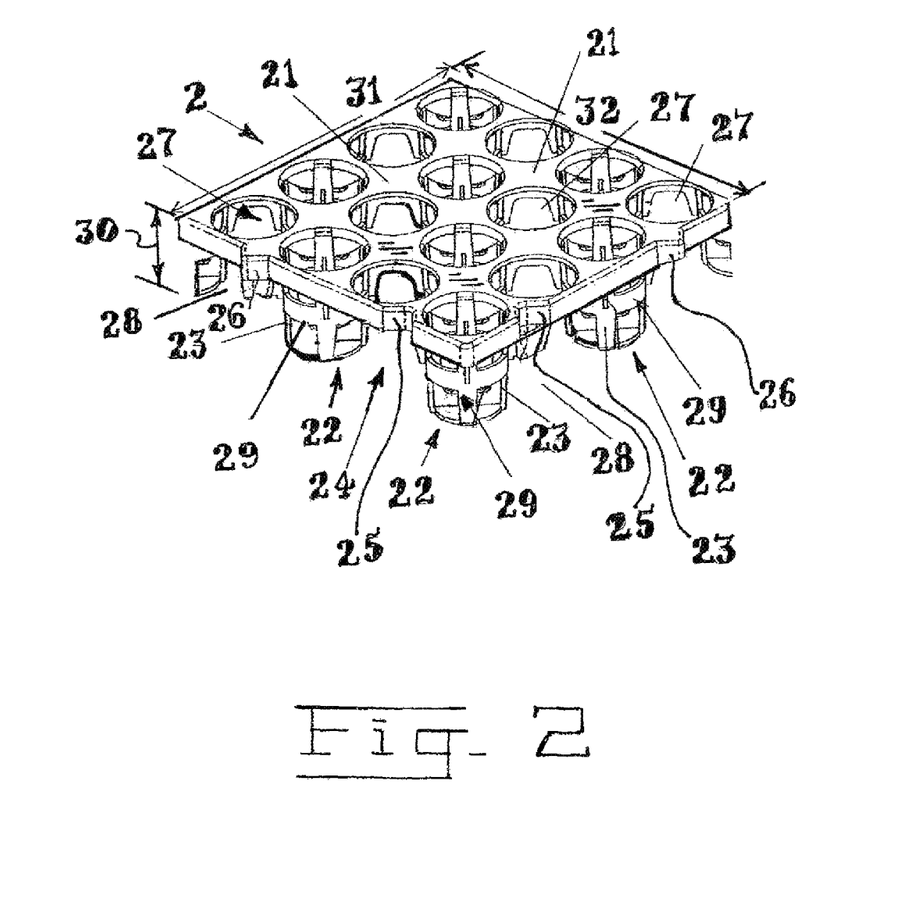
FIG. 2 is a perspective view of a scaffold for use in the water containment module of the invention.

FIG. 2 shows an illustrative embodiment of a suitable scaffold. The scaffold shown in FIG. 2 is a type as described in U.S. Pat. No. 8,696,241 and sold as VersiCell™ 3150 by Elmich PTE Limited, Singapore. The invention is not limited to this particular scaffold material. As shown in FIG. 2, scaffold 2 includes top surface 21. Cups 29 define both bottom surface 22 and spacing members 23. Spacing members 23 extend from bottom surface 22 to top surface 21 and thereby define the height 30 of scaffold 2.

Top surface 21 as shown is a continuous surface having top surface voids 27. The void area of top surface 21 is at least 25% and preferably at least 50% or at least 60%. The void area is determined by dividing the cumulative area of top surface voids 27 by the area of top surface 21 (including the area of top surface voids 27). In the embodiment shown in FIG. 2, are area of top surface 21 is equal to length 31×width 32. Although top surface 21 is continuous in the embodiment illustrated in FIG. 2, it can instead be discontinuous.

In the embodiment shown in FIG. 2, bottom surface 22 is discontinuous, being defined by the bottom surfaces of cups 29, cups 29 not being connected to each other at the bottom surface. If desired, bottom surface 22 may be continuous, such as in the manner of top surface 21. Bottom surface voids 28 are provided in bottom surface 22; in the embodiment shown bottom surface voids 28 represent the spaces between the bottom surfaces of cups 29. The void area of bottom surface 22 is at least 25% and preferably at least 50% or at least 60%. The void area of bottom surface 22 is determined by dividing the cumulative area of bottom surface voids by the area of scaffold 2 bottom surface 21 (including the area of bottom surface voids 28), which in the embodiment shown in FIG. 2 is equal to length 31×width 32.

Scaffold 2 has an internal void area of at least 50%, preferably at least 75%, at least 90% or at least 93%. The internal void area may be up to 98% or up to 96%. Internal void area is that portion of the volume of scaffold 2 (i.e. length 31×width 32×height 30 of scaffold 2) not occupied by the material of construction of scaffold 2 itself. The volume of the scaffold itself is readily determined by dividing its weight by the bulk density of its material(s) of construction. Alternatively, the scaffold can be placed in a container having the same length and width as the scaffold. The amount of fluid needed to fill the container to the height of the scaffold is the void volume.

Top surface voids 27, bottom surface voids 28 and internal voids 24 together define multiple fluid paths from and through top surface 21 to and through the bottom surface 22. In some embodiments, at least some of such multiple fluid paths have smallest cross-sectional areas of at least 25 mm$^2$, at least 100 mm$^2$ or at least 400 mm$^2$.

In some embodiments, at least some of top surface voids 27 and bottom surface voids 28 have areas of at least 25 mm$^2$, at least 100 mm$^2$ or at least 400 mm$^2$.

In preferred embodiments, scaffold 2 further has multiple apertures on one or more, preferably all, sides, the apertures preferably having areas of at least 25 mm$^2$, at least 100 mm$^2$ or at least 400 mm$^2$. The void area of a side may be at least 25%, at least 50%, at least 60% or at least 75%.

Scaffold 2 has a compressive strength of at least 50 kN/m$^2$ as measured according to ASTM D1621. The compressive strength in some embodiments is at least 100 kN/m$^2$, at least 250 kN/m$^2$ or at least 500 kN/m$^2$. Compressive strength for purposes of this invention is measured by applying a compressive force to top surface 21 of scaffold 2, in a direction normal to top surface 21.

Scaffold 2 has a height 30 of 2.54 mm to 101.6 cm as measured from the top surface to the bottom surface. In some embodiments, height 30 is at least 12.7 mm, at least 25 mm or at least 30 mm. The height in some embodiments may be up to 25.4 cm, up to 12.7 cm, up to 10.16 cm or up to 7.62 cm. Scaffold 2 has a top surface area (i.e. equal to length 31×width 32 for the embodiment shown in FIG. 2) of 100 to 15,000 cm$^2$. The top surface area in some embodiments may be at least 750 cm$^2$ or at least 900 cm$^2$ and up to 12,000 cm$^2$ or up to 10,000 cm$^2$.

The material of construction of scaffold 2 is not particularly critical provided the compressive strength and void volume described before are both achieved. Thermoplastics such as polyolefins, impact-modified polystyrene, high-impact polystyrene, acrylonitrile-butadiene-styrene resins, polyesters, polyamides and the like are useful. Metals can be used.

Other suitable scaffold materials are described, for example, in U.S. Pat. Nos. 5,250,340, 5,256,007, 6,428,870, 6,736,569 and 8,696,241. Other suitable commercially available products include NeroCell™ Drainage Cells from Rainsmart Solutions; BodPave Porous Paving Grids from Terram Geosynthetics; and hollow structures such as Ellipse™ Tank Modules from Rainsmart Solutions.

Referring again to FIGS. 1 and 2, hydrophilic flexible polymer foam 3 fills internal void areas 24 of substantially planar scaffold 2 and extends at least to external surfaces of spacing members 23 of substantially planar scaffold 2. Spacing members 23 preferably are encapsulated by hydrophilic flexible polymer foam 3. Top surface 21 and bottom surface 22 of substantially planar scaffold 2 may or may not be encapsulated. If top surface 21 and/or bottom surface 22 are not so encapsulated, hydrophilic flexible polymer foam 3 preferably extends to the planes defined by top surface 21 and bottom surface 22. In some embodiments, hydrophilic flexible polymer foam 3 extends above top surface 21 to a distance of, for example, 1 to 12.7 mm and below bottom surface 22 by a similar distance.

Hydrophilic flexible polymer foam 3 is characterized by having a dry foam density of 48 to 240 kg/m$^3$ as measured according to ASTM D3574. The foam density may be at least 64 kg/m$^3$ or at least 96 kg/m$^3$ and may be, for example, up to 200 kg/m$^3$, or up to 180 kg/m$^3$.

By "flexible" it is meant that hydrophilic flexible polymer foam 3 by itself has an elongation to break of at least 50% and a 25% indentation force deflection of no greater than 100 newtons, each as measured according to ASTM D3574.

Hydrophilic flexible polymer foam 3 preferably has at least 25%, more preferably at least 50% open cells.

Flexible hydrophilic polyurethane foam 3 absorbs water. The foam preferably exhibits a water holding of at least 150 g water per 2.54 cm thickness when measured on a 10.16 cm×10.16 cm foam sample. The foam may exhibit a water holding of at least 165 g water/2.54 cm thickness or at least 180 g water per 2.54 cm thickness. Water holding is measured by drying a rectilinear foam sample (approximately 4 inch×4 inch×1 inch thick, (10.16 cm×10.16 cm×2.54 cm)) at 90-100° C. until a constant weight is obtained, and measuring the dimensions and weight of the dried foam. The foam is then submerged in water for at least 12 hours at 22±3° C., removed and allowed to sit over a grate or drain for 2 hours at 22±3° C. to allow excess water to drain. The samples are then re-weighed and their dimensions re-measured. Swelling is calculated as the volume gained (volume of the wetted and drained sample minus the volume of the dried sample), divided by the volume of the dried sample.

Water holding (WH) is calculated as:

$$WH\ (g) = [(Weight_{2\ hr,dry} - Weight_{dry})] \div Thickness_{2\ hr,dry}$$

wherein Weight$_{2\ hr,dry}$ is the weight of the sample after being submerged and drained for 2 hours, Weight$_{dry}$ is the weight of the dried sample before submersion, and Thickness$_{2\ hr,dry}$ is the thickness of the sample in centimeters after being submerged and drained for 2 hours.

Hydrophilic flexible polymer foam 3 may be, for example, a polyurethane foam, a foamed rubber, a latex foam or the like. A preferred hydrophilic flexible polymer foam is a polyurethane foam that contains 10 to 70 wt.-%, preferably 15 to 50 wt.-%, of oxyethylene units, based on the weight of the foam. Such a polyurethane foam is conveniently prepared by reacting, in one or more steps, foam-forming ingredients that include at least homopolymer or copolymer of ethylene oxide with a polyisocyanate and water. The ethylene oxide homopolymer or copolymer or a portion of it may be reacted with some or all of the polyisocyanate in a first step to produce an isocyanate-functional prepolymer which is then reacted with water and optionally one or more polyols (including more of the ethylene oxide homopolymer or copolymer) to produce the foam.

Examples of suitable hydrophilic flexible polymer foams are described, for example, in U.S. Pat. Nos. 4,365,025, 6,479,433, 8,809,410 and 9,814,187, US Published Patent Application Nos. 2004-0049980, 2006-0142529 and 2016-0115387, and PCT/US2018/052323.

Turning back to FIG. 1, drainage layer 4 includes weight bearing members 15 that extend downwardly from bottom surface 22 of water retaining layer 13. Drainage layer 4 has a height 14 of 0.508 to 10.16 cm. In some embodiments drainage layer 4 has a height 14 at least 0.635 cm or at least 0.846 cm and up to 5.08 cm or up to 2.54 cm.

Drainage layer 4 has a void volume of at least 50%. The void volume may be at least 60% or at least 70% and may be up to 98%, up to 95%, up to 90% or up to 80%. Void volume is measured in a manner analogous to that described above with respect to scaffold 2.

Drainage layer 4 is further characterized in that weight-bearing members 15 define multiple flow paths for the movement of a fluid flowing downward from the water-retaining layer 13 to and out of side surfaces and/or bottom of drainage layer 4. The multiple flow paths, in their broadest aspect, include one or more inlet openings leading from water retaining layer 13 into drainage layer 4, one or more outlet openings leading out of one or more side surfaces and/or the bottom of drainage layer 4, and a fluid path between at least one inlet opening and at least one outlet opening. There is no restriction on the shape and size of the various openings and fluid paths.

Similarly, there is no restriction on the geometry or number of weight-bearing members 15, provided the void volume of drainage layer 4 is as above, the multiple fluid paths are present, and weight-bearing members 15 can bear the weight of superimposed layers (including vegetation and/or absorbed water when present).

Thus, weight-bearing members 15 may be discrete legs or posts that extend downwardly from diverse positions of bottom surface 22 of water retaining layer 13. Such legs can be positioned at corners and/or at other positions under bottom surface 22. Alternatively or in addition, weight-supporting members 15 may take the form of woven, braided, stitched, needle-punched and/or entangled monofilaments that are in the form of a porous mat. Examples of such a mat structure are sold by Keene Building Envelope Products as Driwall™ Prefabricated Composite Drains 10/013, 10/025, 10/040, 10/045, 10/045-2 and 10/046 and dimpled core drainage composites such as J-Drain 400, J-Drain 420 and J-Drain 400-XL, all sold by JDR Enterprises, Alpharetta, Georgia USA.

Drainage layer 4 may take the form of an open-celled reticulated structure. Scaffolds as described above are also suitable drainage layers.

Drainage layer 4 may be integrated with scaffold 2, such as, for example, filling only an upper portion of scaffold 2 with the hydrophilic flexible polymer foam 3, leaving the unfilled portion to serve as drainage layer 4.

In other embodiments, drainage layer 4 is a separate construction that is bonded to water retaining layer 13 by hydrophilic flexible polymer foam 3 or other adhesive layer.

A porous fabric may be laminated to the top surface of drainage layer 15. Such a porous fabric can in some embodiments improve adhesive bonding to water retaining layer 13. Such a porous fabric is pervious to water so water can drain from water retaining layer 13 to drainage layer 4 in the finished product.

In some embodiments, the water containment module further comprises c) a porous horticultural growth media layer 11 (FIG. 3) bonded to the top surface of water retaining layer 13, porous horticultural growth media layer 11 having a thickness of 0.508 to 101.6 cm and comprising (c-1) at least one particulate filler embedded in (c-2) a porous hydrophilic polymer foam.

Figure 3:
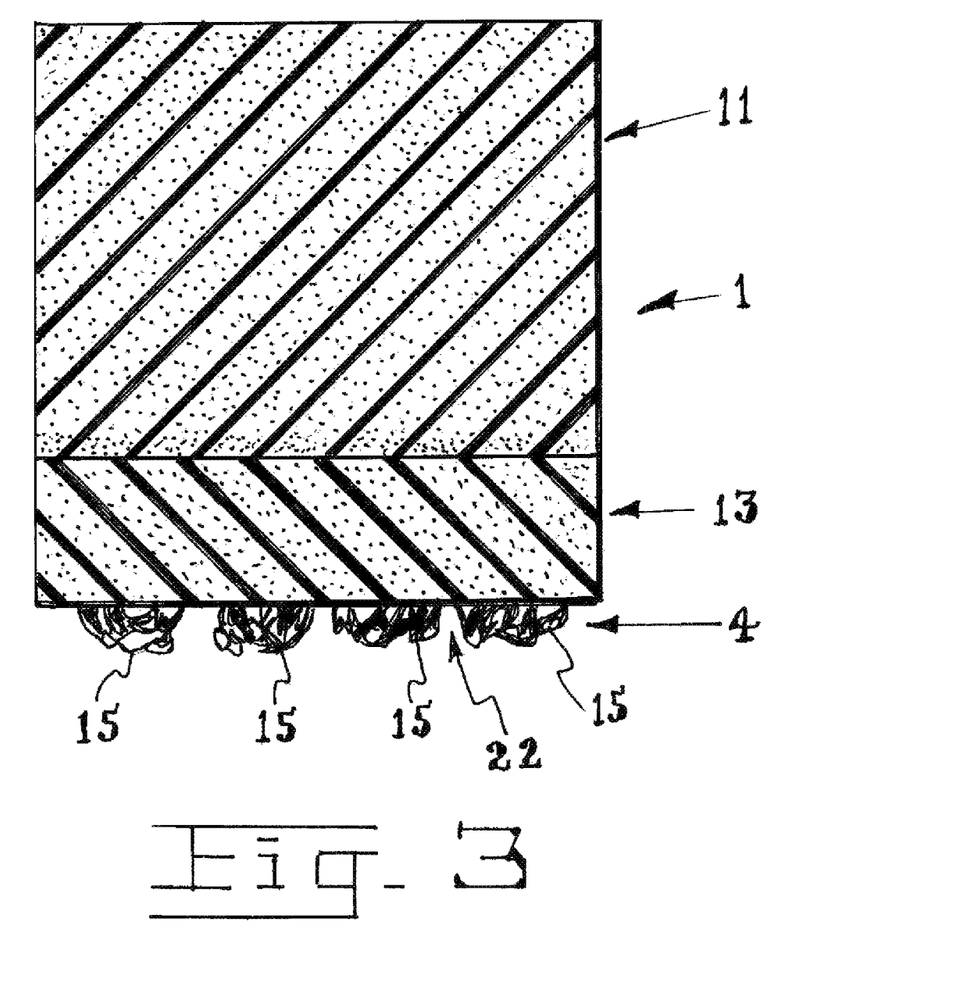
FIG. 3 is a front view of a second embodiment of a water containment module of the invention.

The particulate filler is any material that is a solid at a temperature of at least 50° C., is in the form of particles, and does not inhibit the growth of a plant or fungus planted in porous horticultural growth media layer 11. The particulate filler may or may not contain one or more nutrients for the plant or fungus.

Suitable particulate fillers therefore include materials that are inert to plant or fungal growth, such as inorganic materials like sand, clay, a hydrated silica such as vermiculite and/or perlite, biotite, phlogopite, polymer foam particles (apart from the binder), limestone, gypsum, mica, hydrated obsidian, diatomaceous earth, other ground rock, carbon black, graphite and the like. Also included are organic materials or materials that include one or more organic components such as soil, moss (such as peat moss and/or sphagnum moss), ground or chopped plant matter, manure, coconut and other plant fiber, garbage, ground tree bark, wood shavings, sawdust, coffee grinds, humus, charcoal, coke, coal and the like. The particulate filler may consist of or include fertilizer pellets or other pelletized nutrient compositions.

The particulate filler may also include solid functional additives such as solid fungicides, insecticides, pigments, selective herbicides, and the like.

Mixtures of any two or more of the foregoing particulate fillers may be used.

The particle size may be, for example, up to 10 millimeters (longest dimension) as determined by sieving methods.

The hydrophilic polymer foam (c-2) is conveniently as described above with regard to the water retaining layer.

In some embodiments, porous horticultural growth media layer 11 comprises 10 to 99 weight percent, based on the combined weights of components (c-1) and (c-2), of the particulate filler, and 90 to 1 weight percent, based on the combined weights of components (c-1) and (c-2), of the porous hydrophilic polymer foam.

Porous horticultural growth media layer 11 in some embodiments may have a thickness of, for example, at least 0.75 cm, at least 1.27 cm, at least 2.54 cm or at least 5.08 cm, up to 101.6 cm, up to 50.8 cm, up to 25.4 cm, up to 12.7 cm, up to 10.16 cm, up to 7.62 cm, up to 5.08 cm or up to 2.54 cm.

Porous horticultural growth media layer 11 is characterized in being porous (when dried) and, when dried, capable of absorbing and retaining liquid moisture. Porous horticultural growth media layer 11 may exhibit a water uptake of at least 500 weight percent, based on the weight of the dried growth medium, when measured as described above. The water uptake may be at least 600% to as much as 1000% or more. The wet density may be, for example, 250 kg/m$^3$ to 1500 kg/m$^3$ or 500 kg/m$^3$ to 0.75 kg/m$^3$, measured as indicated in the following examples.

Porous horticultural growth media layer 11 in some embodiments is characterized by having a dry foam density of 16 to 320 kg/m$^3$ as measured according to ASTM D3574. The dry foam density may be at least 24 kg/m$^3$, at least 32 kg/m$^3$ at least 48 kg/m$^3$ or at least 64 kg/m$^3$ and may be, for example, up to 320 kg/m$^3$, up to 280 kg/m$^3$, up to 240 kg/m$^3$, up to 200 kg/m$^3$, up to 160 kg/m3 or up to 120 kg/m$^3$.

Porous horticultural growth media layer 11 preferably has at least 25%, more preferably at least 50% open cells.

One or more plant seeds, plant seedlings, cuttings, callus cultures, growing plants, fungi and/or fungus spores may be embedded in porous horticultural growth media layer 11, where they are cultivated to produce a plant or fungus rooted in porous horticultural growing media layer 11.

Water containment module 1 may have any convenient shape (as viewed from top or bottom). A convenient shape is a rectangle (including square), but other shapes such as triangular, hexagonal and other polygons can be used. Rounded or curved shapes such as circular or ellipsoidal shapes are useful. Other arbitrary shapes can also be used.

A water containment module of the invention may further comprise alignment means arranged along one or more sides of the water containment module for aligning the water containment module with an adjacent water containment module.

An embodiment of such alignment means is shown in FIG. 2. Scaffold 2 includes notches 25 and reciprocating tabs 26 positioned along the sides of scaffold 2. Tabs 26 fit into notches 25 when two water containment modules are placed adjacent to each other, aligning them into a desirable relative position and in addition reducing or preventing slippage, misalignment or other depositioning. Keyways can be positioned along the sides of scaffold 2, such that the keyways align when two water containment modules are correctly positioned with regard to each other. A tie member that simultaneously fits into both keyways can then align and connect the modules. An example of such a keyway and tie member system is described in WO 2002/014608.

A wide variety of other interlocking, snapping or other means can be employed to align and/or connect adjacent modules. A useful design includes a protruding tab and a receiving slot or opening system, in which a protruding tab of one module engages with the receiving slot or opening of an adjacent module to align and/or connect the modules.

Water containment module 1 can be prepared in various ways. For example, water-retaining layer 13 can be formed by first producing hydrophilic flexible foam 3 and assembling the foam 3 into scaffold 2. An example of such a manner of construction is described, for example, in U.S. Pat. No. 8,696,241. A water-retaining layer 13 made in such a manner can be laminated to a separate drainage layer 4 to form a water containment module 1 of the invention, provided water can drain from water-retaining layer 13 into drainage layer 4. Alternatively, a lower portion of scaffold 2 can be left unfilled to produce the separate drainage layer 4.

In a preferred method of construction, hydrophilic flexible foam 3 is produced in situ by forming a foam-forming reaction mixture, introducing the foam-forming reaction mixture into scaffold 2 and allowing it to rise and cure to produce foam 3 that fills the internal void area of scaffold 2 and extends at least to external surfaces of the spacing members 23 of scaffold 2, thereby producing water-retaining layer 13. This step of producing water-retaining layer 13 can be performed by stacking scaffold 2 atop a separate drainage layer 4, with a water-pervious barrier layer interposed between scaffold 2 and separate drainage layer 4 so that the foam-forming reaction mixture does not penetrate into drainage layer 4 and fill the void spaces thereof. The barrier layer should be porous, such that its pores are generally small enough to substantially prevent the viscous reaction mixture from penetrating but allow water to penetrate from water-retaining layer 13 to drainage layer 4 in the finished product. A filter fabric or scrim is generally suitable as the barrier layer. The cured foam 3 in such embodiments forms an adhesive bond to drainage layer 4, yet permits water to drain through the bond and barrier layer. Any foam dome extending above the height of scaffold 2 may be entirely or partially removed.

If desired, a separate adhesive can be used to bond water-retaining layer 13 to drainage layer 4. Such an adhesive should either be porous or discontinuous so water can penetrate it and flow from water retaining layer 13 to drainage layer 4 in the finished product.

Porous horticultural media layer 11 is most conveniently produced by forming a reaction mixture that contains the particulate filler and polymer foam precursors, applying the reaction mixture to the top of water-retaining layer 13 and allowing the reaction mixture to rise and cure. Alternatively, it can be formed separately and laminated or otherwise bonded to water-retaining layer 13. As before, any adhesive layer should be porous or discontinuous such that water can flow from porous horticultural growth media layer 11 into water-retaining layer 13 in the finished product.

A green or blue roof area is produced by arranging multiple water retainment modules adjacent to each other to form an assembly. This invention has the advantages of easy, rapid and inexpensive assembly. Maintenance, repair and replacement of the water retainment modules is simplified as individual modules can be removed easily from an installation. The individual modules can be installed directly over a water-proof membrane or other roof covering. The modules produce the multiple functions of 1) providing a growth medium for a vegetative layer; 2) capturing water falling onto the module; 3) retaining and detaining such water; 4) releasing the water to the bottom of the module at a controlled rate and 5) forming drainage channels for transporting the released water to a drain, scupper or other collection apparatus.

In particular, precipitation or other water falling onto the module penetrates into porous horticultural growth media layer 11 (when present). The porous and hydrophilic nature of porous horticultural growth media layer 11 allows such layer to capture and hold at least a portion of the water, thereby supplying water to the root system of vegetation growing in or atop of porous horticultural growth media layer 11 of module 1 and slowing the passage of water out of the module. Water can drain under force of gravity from porous horticultural growth media layer 11 to water retaining layer 13.

Similarly, water retaining layer 13 also captures and retains water draining into it from porous horticultural growth media layer 11 (or, if horticultural growth medium layer 11 is absent, from other overlying structures) or other water falling directly onto water retaining layer 13, again slowing the passage of water from the module. Water can drain under force of gravity from water retaining layer 13 into drainage layer 4. Drainage layer 4 provides a conduit though which water passing through the module can be conducted to a drainage system, scupper or other collection means.

The following examples are provided to illustrate the invention, but are not intended to limit the scope thereof. All parts and percentages are by weight unless otherwise indicated.

EXAMPLE 1 AND COMPARATIVE SAMPLES A-B

A wooden box is constructed having a height of 2 inches (5.08 cm), 4 inch (10.16 cm) sides, an open top and a closed bottom.

A 4 inch×4 inch (10.16 cm×10.16 cm) section of a drainage layer (Driwall™ PCD 10-040 Prefabricated Composite Drain from Keene Building Envelope Products, Mayfield Heights, Ohio, USA) is placed in the bottom of the box. This drainage layer consists of a 102 g/m$^2$ filter fabric laminated to the top of a 576 g/m$^2$ mat of entangled thermoplastic monofilaments. The entangled monofilaments define a void area on the underside of the mat. The product thickness is nominally 0.4 inches (10 mm).

A 4 inch×4 inch (10.16 cm×10.16 cm) section of a scaffold material is laid atop the drainage layer. The scaffold material is VersiCell 3150 from Elmich PTE Ltd, Singapore. This material has a height of 30 mm, a weight of 2.0 kg/m$^2$, a compressive strength of about 600 kN/m$^2$, a surface void area of 62% and an internal void area of 95%. This material is described, for example, in U.S. Pat. No. 8,696,241. It consists of a backing plate that defines a top surface having multiple holes; a series of tubular structures extending from the backing plate in which half the holes coincide with the tubular structures and the other half of the holes are unsupported and located between the tubular structures. The tubular structures contain apertures in their side walls.

A polyurethane prepolymer is prepared by reacting 21 parts of a diphenyl methane diisocyanate (MDI) product containing predominantly the 4,4'-isomer, 14 parts of a 50/50 by weight mixture of the 2,4'- and 4,4'-isomers of MDI, 13 parts of a random, nominally trifunctional, 1500 equivalent weight copolymer of 78% ethylene oxide and 22% propylene oxide, and 52 parts of a 1000 molecular weight poly(ethylene glycol). A reaction mixture is prepared containing 39 parts of the resulting prepolymer, 58.5 parts water, 1.5 parts activated charcoal and 1 part of a foam-stabilizing surfactant mixture.

The reaction mixture is poured into the box, where it penetrates into the scaffold, rises, and cures to form a hydrophilic, flexible polyurethane foam that occupies the entire void area defined by the scaffold. The resulting foam extends to and encapsulates the side walls of the scaffold and forms a dome extending above the top surface of the scaffold. The foam also extends to the bottom surface of the scaffold, where it contacts the filter fabric of the drainage layer, adhering thereto and thereby forming a composite structure in which the bottom drainage layer is laminated to the upper foam-filled scaffold layer. The filter fabric prevents the foam formulation and resulting foam from penetrating into the drainage layer. As a result the drainage layer defines a void area, with the various monofilaments forming supports extending downwardly away from the bottom surface of the planar scaffold.

The resulting water containment and drainage module is removed from the mold and the foam dome is planed down to the the height of the scaffold upper surface. After drying at room temperature for 2 hours, this module has a weight of 5.5 lb/ft$^2$ (26.8 kg/m$^2$); this weight decreases to 1.03 lb/ft$^2$ (5.03 kg/m$^2$) after 24 hours of drying at 90-100° C. Its water retention is measured at no applied pressure and at 100 lb/ft$^2$ (488 kg/m$^2$) applied pressure.

The height of the box is increased by about 3 inches (7.62 cm). The module is re-inserted into the modified box with the drainage layer at the bottom.

A second prepolymer is prepared by reacting 18.6 parts of a MDI (containing predominantly the 4,4'-isomer, 12.4 parts of a 50/50 by weight mixture of the 2,4'- and 4,4'-isomers of MDI, 7 parts of a random, nominally trifunctional, 5000 number average molecular weight copolymer of 78% ethylene oxide and 22% propylene oxide, and 52 parts of a 2400 number average molecular weight copolymer of ethylene oxide and propylene oxide having a nominal hydroxyl functionality of 2 and a number average molecular weight of approximately 2,400 g/mole and containing 64% oxyethylene groups.

A reaction mixture is prepared containing 17 parts of the resulting prepolymer, 42.9 parts water, 39.1 parts Purple Cow™ growth media and 1 part of a foam-stabilizing surfactant mixture. This reaction mixture is poured into the box on top of the foam-filled scaffold material, where it rises and cures to form a porous growth medium in which the Purple Cow™ media is embedded within a hydrophilic polyurethane foam. The porous growth medium bonds to the underlying water containment and drainage module to form a laminate that includes the bottommost drainage layer, which is bonded to the foam-impregnated scaffold, which is in turn bonded to the uppermost porous horticultural growth media layer. This assembly is removed from the box and the top layer planed to a height of 3 inches (7.62 cm). Its weight after 2 hours drying at room temperature and again after 24 hours drying at 90-100° C. are measured, as are its water retention under no applied pressure and 100 lb/ft$^2$ (488 kg/m$^2$) applied pressure.

Results of the various measurements are as indicated in Table 1.

TABLE 1

| Property | Impregnated Scaffold + Drainage Layer Only | Impregnated Scaffold, Drainage Layer Plus Horicultural Medium Layer |
| --- | --- | --- |
| Total Areal Density, kg/m$^2$ | 5.606 | 16.786 |
| Drainage Layer Areal Density, kg/m$^2$ | 0.678 | 0.678 |
| Scaffold Areal Density, kg/m$^2$ | 2.00 | 2.00 |
| Scaffold Impregnating Foam Areal Density, kg/m$^2$ | 2.928 | 2.928 |
| Porous horticultural Growth Media Layer Areal Density, kg/m$^2$ | None | 11.18 |
| Water Retention (no applied pressure), g | 224 | 583 |
| Water Retention, 448 kg/m$^2$ applied pressure | 220 | N.D. |

N.D. = not determined.

What is claimed is:
1. A water containment module, comprising:
   a) a water retaining layer comprising
      (a-1) a substantially planar scaffold, having a continuous or discontinuous top surface that defines a plane, a continuous or discontinuous bottom surface that defines a plane, spacing members extending from the bottom surface to the top surface, a height of 2.54 mm to 101.6 cm as measured from the top surface to the bottom surface, and a top surface area of 100 to 15,000 cm$^2$, the scaffold having top surface voids, bottom surface voids and internal voids that together define multiple fluid paths from and through the top surface to and through the bottom surface, a top surface void area of at least 25%, a bottom surface void area of at least 25%, an internal void volume of at least 50% and up to 96%, the substantially planar scaffold further having multiple apertures having areas of at least 25 mm$^2$ on at least one side, a void area of at least 25% on said at least one side; and a compressive strength of at least 50 kN/m$^2$, and (a-2) a hydrophilic flexible polymer foam having a dry foam density of 48 to 240 kg/m$^3$ filling the internal void area of the substantially planar scaffold and extending at least to the planes defined by the top surface and the bottom surface and encapsulating external surfaces of the spacing members of the substantially planar scaffold, wherein the hydrophilic flexible polymer foam forms a dome extending above the top surface of the substantially planar scaffold;

b) a drainage layer including weight-bearing members extending downwardly from the bottom surface of the water retaining layer, the drainage layer having a height of 0.508 to 10.16 cm and a void volume of at least 50%, the drainage layer being further characterized in that the weight-bearing members define multiple flow paths for the movement of a fluid flowing downward from the water-retaining layer to and out of side surfaces and/or the bottom surface of the drainage layer, and c) a porous horticultural growth media layer bonded to the top surface of the water retaining layer, the porous horticultural growth media layer having a thickness of 0.508 to 101.6 cm and comprising (c-1) at least one particulate filler embedded in (c-2) a porous hydrophilic polymer foam.

2. The water containment module of claim 1 wherein the scaffold has a void volume of at least 90%.

3. The water containment module of claim 2 wherein at least some of the top surface voids and at least some of the bottom surface voids have areas of at least 25 mm$^2$.

4. The water containment module of claim 2 wherein the top surface voids, bottom surface voids and internal voids together define multiple fluid paths from and through the top surface to and through the bottom surface, at least some of such multiple fluid paths having smallest cross-sectional areas of at least 25 mm$^2$.

5. The water containment module of claim 2, wherein the scaffold has a compressive strength of at least 250 kN/m$^2$.

6. The water containment module of claim 2, wherein the scaffold has a height of 25 mm to 10.16 cm and a surface area of 900 to 10,000 cm$^2$.

7. The water containment module of claim 2, wherein the hydrophilic flexible polymer foam has a water holding of at least 150 g per 2.54 cm thickness when measured on a 10.16 cm×10.16 cm foam sample.

8. The water containment module of claim 2 wherein the hydrophilic flexible polymer foam is a polyurethane foam.

9. The water containment module of claim 2, wherein the drainage layer has a void volume of at least 70%.

10. The water containment module of claim 2, further comprising aligning means arranged along one or more sides of the water containment module for aligning the water containment module with an adjacent water containment module.

11. A roof structure comprising a layer formed of adjoining multiple water containment modules of claim 2.

12. The water containment module of claim 1 wherein the porous horticultural growth media layer has a thickness of 2.54 to 10.16 cm.

13. The water containment module of claim 1 wherein the particulate filler comprises 10 to 99% by weight and the porous hydrophilic polymer foam correspondingly comprises 1 to 90% by weight, based on the combined weight of the particulate fill and porous hydrophilic polymer foam.

14. The water containment module of claim 1 wherein the porous horticultural growth media exhibits a water uptake of at least 500% by weight.

* * * * *